United States Patent [19]

Stanke et al.

[11] Patent Number: 5,251,453

[45] Date of Patent: Oct. 12, 1993

[54] LOW REFRIGERANT CHARGE DETECTION ESPECIALLY FOR AUTOMOTIVE AIR CONDITIONING SYSTEMS

[75] Inventors: Edwin J. Stanke, Bloomfield Hills; David L. Montgomery, Utica, both of Mich.

[73] Assignee: General Motors Corporation, Detroit, Mich.

[21] Appl. No.: 947,667

[22] Filed: Sep. 18, 1992

[51] Int. Cl.⁵ ............................................. F25B 49/02
[52] U.S. Cl. ...................................... 62/126; 62/129; 62/133
[58] Field of Search ................... 62/126, 127, 129, 133, 62/323.1, 323.4

[56] References Cited

U.S. PATENT DOCUMENTS

| | | | |
|---|---|---|---|
| 4,395,203 | 7/1983 | Takada | 62/133 X |
| 4,482,007 | 11/1984 | Yoshimi et al. | 165/21 |
| 4,561,260 | 12/1985 | Nishi et al. | 62/115 |
| 4,790,143 | 12/1988 | Hanson | 62/129 X |
| 5,009,074 | 4/1991 | Goubeaux et al. | 62/126 X |
| 5,009,076 | 4/1991 | Winslow | 62/129 |
| 5,150,584 | 9/1992 | Tomasov et al. | 62/126 X |
| 5,161,384 | 11/1992 | Hanson et al. | 62/126 |

Primary Examiner—Harry B. Tanner
Attorney, Agent, or Firm—Vincent A. Cichosz

[57] ABSTRACT

A vehicle air conditioning system has means for measuring a first physical quantity related to air conditioning system load to produce a first signal and means for measuring a second physical quantity related to air conditioning system cooling capacity to produce a second signal. Said first and second signals are used to calculate a predicted refrigerant charge for detection of, and protection from, an inadequate refrigerant charge.

9 Claims, 2 Drawing Sheets

LOW REFRIGERANT CHARGE DETECTION ESPECIALLY FOR AUTOMOTIVE AIR CONDITIONING SYSTEMS

BACKGROUND OF THE INVENTION

The present invention relates generally to low refrigerant level detection and more particularly to such detection in automotive air conditioning systems.

Automotive air conditioning systems employ a mixture of refrigerant and oil, hereinafter referred to as refrigerant charge A compressor receives necessary lubrication from the oil in the refrigerant charge and circulates the refrigerant charge through the system's condenser, expansion valve and evaporator in a refrigeration cycle. Should the refrigerant charge drop in volume due to a system leak, improper service or otherwise, the compressor may not receive sufficient lubrication for continued operation and will eventually become damaged if allowed to run. It is recognized, therefore, that low refrigerant charge detection is desirable as part of an air conditioning system which is responsive thereto to shut the system off prior to the compressor becoming damaged. Typically, the compressor is driven by the automobile's engine and coupled thereto via an electromagnetic cycling clutch which engages the compressor to the engine. A low refrigerant charge typically causes disengagement of the cycling clutch to prevent compressor damage.

Some systems employ a variable displacement compressor which can be destroked to account for a certain amount of refrigerant charge loss which might otherwise require compressor shut down; however, the amount of destroke is finite and refrigerant charge loss beyond a certain amount will still require compressor shut down to avoid damage. The primary purpose of displacement variability is to control system cooling capacity and in practice has little effect as protection from a low refrigerant charge. Variable displacement compressors, therefore, are also used in conjunction with a cycling lutch as part of low charge protection. Variable displacement compressors are typically more costly than fixed displacement compressors for equivalent cooling capacities and also require multiple point sensing of system pressures and temperatures for adequate system control.

Other systems using fixed displacement compressors employ the cycling clutch to control cooling capacity by running the compressor intermittently in response to detected temperature and/or pressure parameters of the system. At least one such system has a fixed-size expansion valve orifice and, when operating with a proper refrigerant charge, is characterized by dependent pressure and temperature on the low-side (suction side) of the compressor. This type of system utilizes a low-side pressure transducer to cause the engagement and disengagement of the cycling clutch to control cooling capacity of the system. If the refrigerant charge becomes too low, low pressure and high temperature results on the low-side of the compressor. Low pressure in this area in a properly charged system would indicate low temperature, which indicates the need for less cooling capacity. The low pressure therefore causes more frequent cycling of the clutch and less on time of the compressor. Increased cycling at a low refrigerant charge and corresponding higher temperatures enhances compressor durability. However, cycling the clutch to control cooling capacity in a properly charged system tends to place uneven loads upon the engine which reduce fuel efficiency; further, frequent cycling may become annoying to some drivers. It is also known that systems with fixed expansion valves vary in cooling efficiency since the evaporation rate of the refrigerant charge therethrough is optimal within only a relatively small window of operating conditions.

Still a further fixed displacement compressor system utilizes a variable expansion valve to optimize refrigerant charge expansion therethrough for increased cooling efficiency throughout a larger window of operating conditions, to reduce compressor cycling for controlling cooling capacity, and to smooth compressor loads upon the engine. However, in systems utilizing a variable expansion valve, even with a proper refrigerant charge, low-side pressure and temperature are not always dependent since pressure may change rapidly with changing expansion valve orifice size; therefore, a pressure transducer will not appropriately indicate low side temperature as it would in a system having a fixed expansion valve orifice. Such a system typically utilizes a low-side temperature transducer to cause the engagement and disengagement of the cycling clutch to further control cooling capacity of the system. If the refrigerant charge becomes too low, the resulting elevated temperature on the low-side of the compressor would, without further control, cause reduced cycling and more compressor on time. Reduced cycling at low refrigerant charge will eventually lead to compressor damage.

SUMMARY OF THE INVENTION

It is therefore an object of the present invention to provide for a relatively inexpensive automotive air conditioning system through the use of a fixed displacement compressor and minimal dedicated sensing transducers for the control and protection thereof.

Another object of the present invention is to reduce uneven compressor loads upon a vehicle engine caused by compressor cycling while at the same time providing for efficient control of cooling capacity throughout a wide range of system operating conditions.

Still a further object of the present invention is to provide for adequate low refrigerant charge protection in an vehicle air conditioning system characterized b the advantages that the prior listed objects of the present invention would provide.

Consistent with these objects and a preferred embodiment of the present invention, an automotive air conditioning system has a compressor, expansion valve and an evaporator. The system includes means for measuring physical quantities indicative of both the load then placed upon the system and the cooling capacity of the system. Means for predicting low refrigerant charge from the measured physical quantities are provided as are means responsive to a predicted low refrigerant charge for disabling the compressor to prevent damage thereto from continued operation.

The above and other advantages of the invention will become more apparent from the following description taken in conjunction with the accompanying drawings.

DETAILED DESCRIPTION OF THE INVENTION

Figure 1:
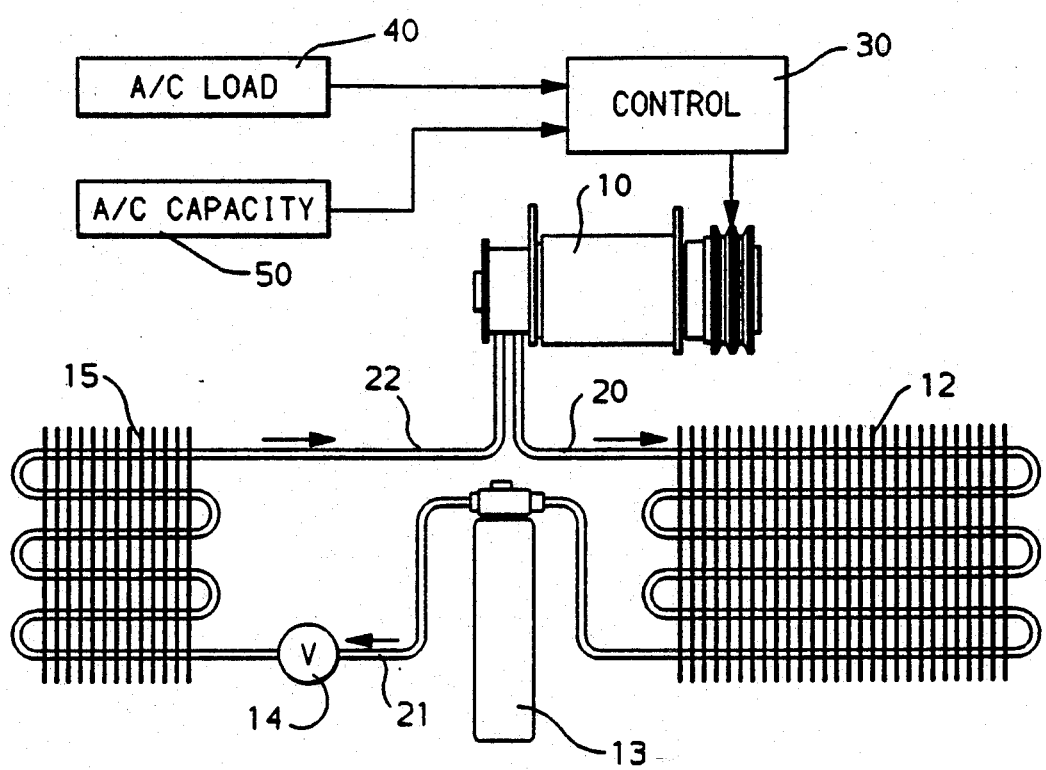
FIG. 1 is a block diagram of an automotive air conditioning system according to the present invention.

Automotive air conditioning (A/C) system shown in FIG. 1 consists essentially of compressor 10, condenser 12, receiver 13, expansion valve 14 and evaporator 15. Compressor 10, driven by the vehicle engine (not shown), ingests low-pressure/low-temperature refrigerant vapor from vapor return line 22, compresses the same and discharges high-pressure/high-temperature refrigerant vapor through discharge line 20. This discharged vapor is cooled through condenser 12, where it undergoes state transformation into high-pressure/high-temperature liquid, and continues on to receiver 13. Receiver 13 acts as reservoir for the liquid refrigerant and may contain a desiccant. Liquid line 21 routes the refrigerant to expansion valve 14 which enters under high pressure and exits under low pressure to evaporator 15. The refrigerant vaporizes within evaporator 15 and absorbs heat surrounding it. Low-pressure/low-temperature vapor leaves evaporator 15 into vapor return line 22 from where it is again ingested into compressor in a continuous refrigeration cycle.

Figure 2:
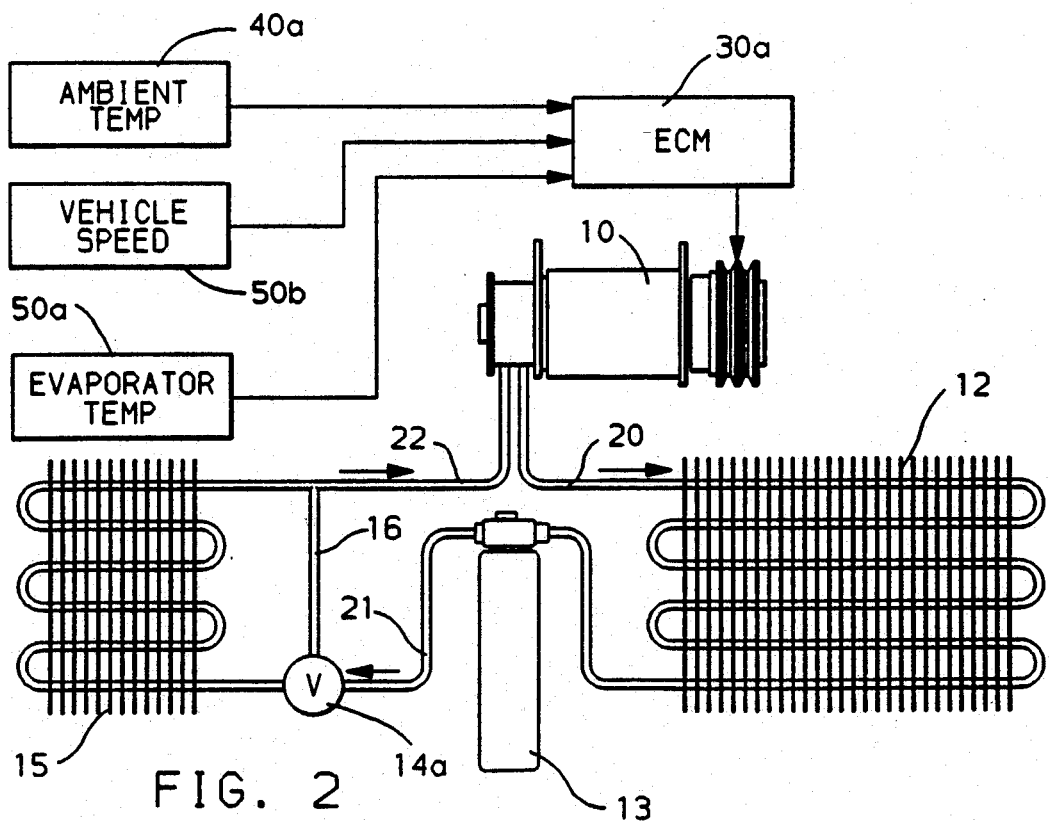
FIG. 2 is a diagrammatic illustration of an embodiment of an automotive air conditioning system according to the present invention.

Compressor 10 is preferably of the type having a fixed volume displacement. Expansion valve 14 may be of the fixed or variable orifice type. The preferred type of expansion valve 14 has a variable orifice and uses low-side vapor pressure near evaporator outlet to modulate the passage of liquid refrigerant from liquid line 21 to evaporator 15 inlet. Such a valve, known generally as a thermal expansion valve and designated 14a in FIG. 2, is designed and calibrated to pass only as much refrigerant as will vaporize for the then existing heat load upon evaporator 15 as is well known to those working in the area of A/C system design. Low-side vapor pressure is shown as a fluidly-coupled input via pressure path 16 to thermal expansion valve 14a to modulate the flow of refrigerant therethrough. Modulation of thermal expansion valve 14a may likewise be accomplished by a well known capillary tube arrangement attached in heat transfer relationship to, but fluidly distinct from, evaporator 15 outlet whereby the capillary tube is fluidly coupled to thermal expansion valve 14a. Other types of variable orifice expansion valves may be employed within the scope of the invention. One such type is a pulse width modulated valve which modulates passage of refrigerant according to a duty cycle signal supplied thereto. Such a valve would require control which is well known to those skilled in the art but is beyond the scope of the present invention's description.

A/C compressor control 30 generally comprises a microcomputer based electrical circuit comprising a CPU, ROM, RAM, internal clock and various analog and digital input and output ports. Control 30 may be a dedicated A/C system controller or may be part of a larger controller such as the type generally known in the automotive industry as an Electronic Control Module and shown in FIG. 2 as ECM 30a. It is preferred to accomplish low refrigerant charge prediction according to the present invention by way of ECM 30a, which predominantly performs engine and powertrain control, since relatively little processor time, ROM and RAM are required; and it is conventional practice within the automotive industry to accomplish overall A/C system control therewith. Further, some inputs to ECM 30a used traditionally for engine control provide desirable data for use in low refrigerant charge prediction according to the invention.

Sensing means 40 indicative of A/C system load in FIG. 1 comprises ambient temperature sensor 40a in FIG. 2. Ambient temperature is the predominant physical quantity affecting A/C load. Other quantities, such as relative humidity and solar load, contribute to A/C system load but to a significantly lesser degree than that of ambient temperature. As such, ambient temperature alone proves to be an adequate indicator of A/C system load and comprises the sole preferred physical quantity used to indicate the same in the present embodiment. An engine control input conventionally monitored by ECM 30a as indicative of ambient temperature is commonly referred to as manifold air temperature or air inlet temperature, and is a preferred measure of A/C load. Therefore, a a thermistor, provides an input to ECM 30a representative of A/C system load. Other available sensors, to the extent that they provide an adequate measure of A/C system load, may be utilized within the scope of the invention. Some further, non-exhaustive, examples include outside air temperature sensors (used primarily for driver information) or A/C system head pressure sensors used to monitor compressor discharge line pressure.

Sensing means 50 indicative of A/C cooling capacity in FIG. 1 comprises evaporator temperature sensor 50a and additionally vehicle speed sensor 50b in FIG. 2. Unlike A/C system load, several factors may significantly affect A/C cooling capacity. Three predominant factors are evaporator temperature, compressor speed and air flow across the condenser. Where compressor speed and air flow across the condenser are constant (such as in a residential air conditioning system), evaporator temperature may be sufficient to indicate A/C cooling capacity. However, where compressor speed and air flow across the condenser vary (such as in an automotive air conditioning system), evaporator temperature alone may not yield an accurate measure of A/C cooling capacity at all different compressor speeds and condenser airflows. Generally, as vehicle speed increases so too does A/C cooling capacity because compressor 10 operates at a higher speed which increases displacement rate, and air flow across condenser 12 is increased which dissipates heat more effectively. It is therefore noted that while evaporator temperature alone may be sufficient to measure A/C cooling capacity in a residential system, further using vehicle speed in addition thereto in an automotive system greatly improves accuracy of the measured A/C cooling capacity since compressor speed and condenser airflow are accounted for; therefore, the preferred exemplary embodiment utilizes measurements of both evaporator temperature and vehicle speed.

Evaporator temperature sensor 50a, typically a thermistor located near evaporator 15 outlet, surrounded by evaporator 15 fins or adjacent evaporator immediately down stream therefrom, provides a first input to ECM 30a representative of A/C cooling capacity. Vehicle speed sensor 50b provides a second input representative of A/C cooling capacity by indirectly indicating compressor speed and airflow across the condenser.

The three inputs (ambient temperature, evaporator temperature and vehicle speed) comprise the physical quantities utilized in this exemplary embodiment to calculate a predicted refrigerant charge. It is noted that various other quantities predictably correlated to either A/C system load or A/C cooling capacity may be utilized to calculate a predicted refrigerant charge consistent with the invention; the present exemplary embodiment exploits commonly pre-existing inputs consistent with the objective of minimizing additional or dedicated hardware as heretofore set forth.

Figure 3:
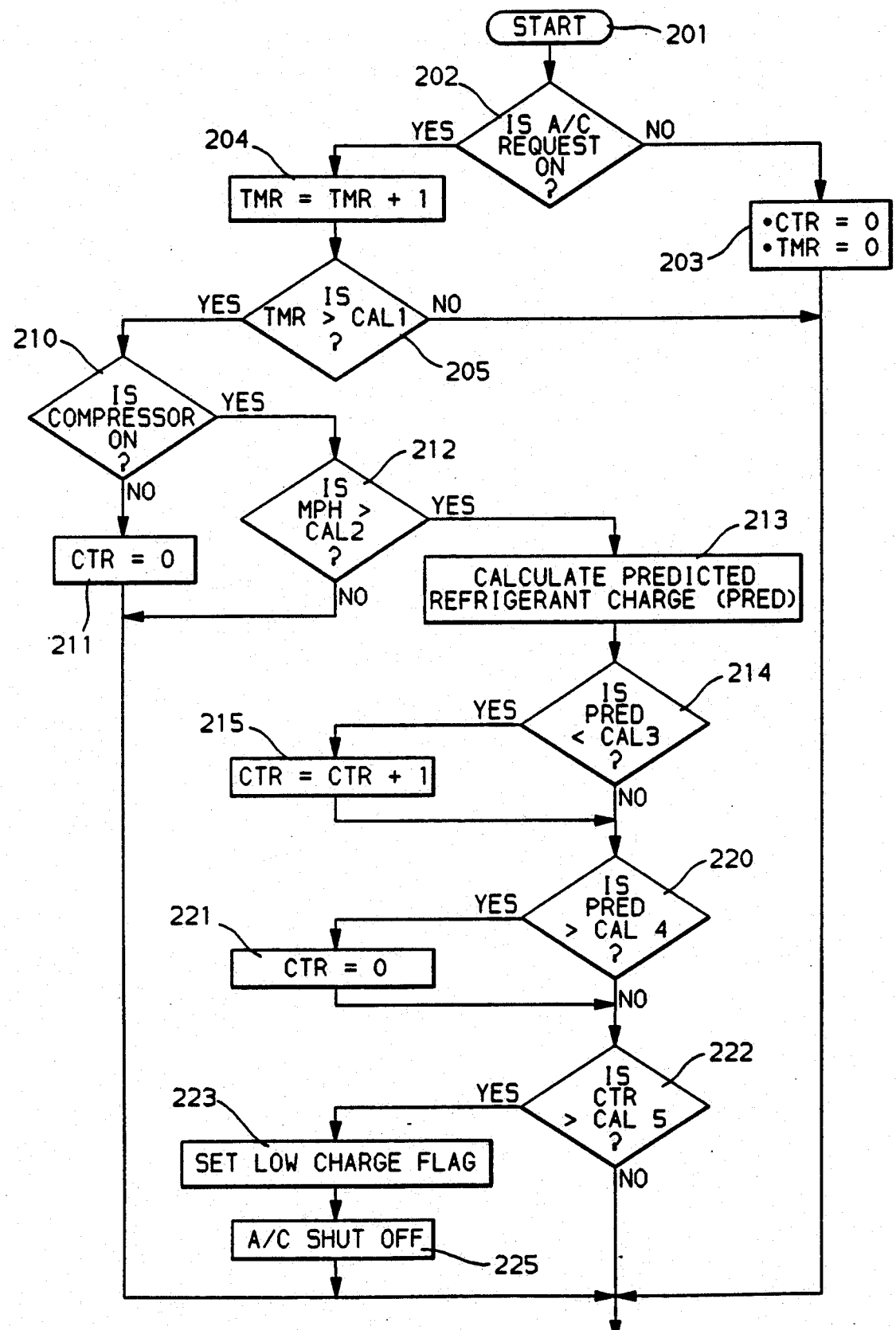
FIG. 3 is a flowchart for controlling low refrigerant charge protection according to the embodiment shown in FIG. 2.

ECM 30a ROM contains programming for operating the CPU and further contains calibration tables of data necessary for the various control functions, including refrigerant charge prediction according to the present invention, performed by ECM 30a. The CPU will typically run a background program which causes sampling of various input ports to obtain data from external sensors, including those previously described, and stores the latest data obtained in temporary registers in RAM. In the present embodiment, ambient temperature, evaporator temperature and vehicle speed data are stored in RAM in registers designated MAT, EVAP and MPH, respectively. The background program also schedules execution of various tasks, such as engine control and, according to the present invention, calculation of a predicted refrigerant charge. At a specific time interval, preferably approximately every one second, a prediction program is executed to calculate a predicted refrigerant charge using MAT, EVAP and MPH as parameters in a linear algebraic equation. FIG. 3 is an overall flow chart of an exemplary prediction program.

Calibration tables for use in the prediction program comprise coefficients for weighting the various parameters being used to calculate a predicted refrigerant charge as a linear function of those parameters. In the present exemplary embodiment, MAT, EVAP and MPH represent those parameters. The calibration tables may be constructed from empirical data obtained through experimentation with the particular vehicle A/C system to be protected and will vary according to the specific A/C system involved. For example, working with a discrete known refrigerant charge, the A/C system is operated and A/C system operating environment variables, such as ambient temperature and vehicle speed, corresponding to the parameters being used to calculate a predicted refrigerant charge, respectively MAT and MPH in the present embodiment, are independently varied to discrete combinations thereof throughout their respective ranges of concern. A/C system variables, such as evaporator temperature, corresponding to the parameters being used to calculate a predicted refrigerant charge, namely EVAP in the present embodiment, are then measured at each discrete combination of system environment variables heretofore described. This is repeated for a plurality of known refrigerant charges at least from the lowest acceptable charge to the highest acceptable charge for the particular system in order to obtain data corresponding to all parameters used in calculating a predicted refrigerant charge throughout the range of refrigerant charge desired to be predicted. The resultant data are processed such as by well known data regression and curve fitting techniques to establish parameter (MAT, EVAP, MPH) coefficients for a linear algebraic equation which yields a predicted refrigerant charge. Precise methodology for obtaining data and interrelating the same is a task within ordinary engineering skill, the above method being provided by way of example and not limitation. Calibration tables are accessed in a conventional manner using a reference value or values and interpolation.

The prediction program is entered at point 201 and begins executing the steps as shown. Step 202 first determines whether a charge prediction is needed by establishing whether or not A/C has been requested. Such a request may be indicated by an A/C request flag in RAM whose state is determined by a manual input, another program which controls vehicle interior temperature or a combination thereof. If A/C has not been requested, refrigerant low-charge event counter (CTR) is set to 0 (zero) and system-stable timer (TMR) is set to 0 (zero) at step 203. The program next proceeds to step 224 where control is returned to the background program.

Assuming A/C is requested, the program proceeds from step 202 to step 204 which increments TMR. Step 205 is next encountered and determines if A/C has been requested for a predetermined number of prediction program executions which corresponds to a predetermined amount of time. The value of TMR is compared to a predetermined on time calibration value (CAL1) obtained from ROM. CAL1 is a value representing a period of time (approximately beginning with A/C being requested) after which the A/C system evaporator is considered stable in its operation. If TMR is not greater than CAL1, A/C has not been requested for a period sufficient to ensure stable evaporator operation and the program proceeds to step 224 where control is returned to the background program.

Assuming A/C has been requested for a sufficient period, then TMR is greater than CAL1 and the program proceeds to step 210 where the state of the compressor is checked. If the compressor is not currently on (cycling clutch disengaged), as may be indicated by an appropriate flag in RAM, step 211 is executed which sets CTR to 0 (zero). When the compressor is not on, refrigerant charge prediction is irrelevant and, therefore, the refrigerant low-charge event counter, CTR, is reset at step 211. Refrigerant charge prediction only occurs over a period of uninterrupted compressor operation. If the compressor is cycled off, CTR will be reset at step 211, thus disregarding any prior accumulated refrigerant low-charge events and initializing CTR for the next period of uninterrupted compressor operation.

Assuming the compressor is on when the program executes step 210, then the program proceeds to step 212 where it is determined if vehicle speed is greater than a threshold speed. The value of MPH is compared to a predetermined speed calibration value (CAL2) obtained from ROM. CAL2 is a value representing a threshold vehicle speed above which the A/C system is considered stable in its operation. If MPH is not greater than CAL2, then it is assumed that the A/C system is not operating in a stable environment and the program proceeds to step 224 where control is returned to the background program.

Assuming the vehicle speed is greater than the threshold speed, then MPH is greater than CAL2 and the program proceeds to step 213 where a predicted refrigerant charge is calculated. The predicted refrigerant charge value may be calculated from an algebraic relationship which defines predicted refrigerant charge (PRED) as a function of A/C load and A/C cooling capacity. According to a preferred embodiment of the invention, ambient temperature as read into RAM as MAT, evaporator temperature as read into RAM as EVAP and vehicle speed as read into RAM as MPH are the specific parameters used to calculate PRED according to the following formula:

$$PRED = C1*MAT + C2*EVAP + C3*MPH + C4*1$$

wherein C1,C2, C3 and C4 are coefficients obtained from calibration tables previously described and stored in ROM as referenced by the measured parameters or combination thereof.

The program proceeds to step 214 where the predicted refrigerant charge value is compared to a predetermined low-charge calibration value (CAL3) obtained from ROM. CAL3 is a value representing the lowest acceptable refrigerant charge for the A/C system. If the value of PRED is not less than CAL3, then the program proceeds directly to step 220. If, however, the value of PRED is less than CAL3, CTR is incremented at step 215 to record and accumulate a refrigerant low-charge event, and then the program proceeds to step 220.

Step 220 next determines if the predicted refrigerant charge value is greater than a predetermined high-charge calibration value (CAL4). CAL4 is a value representing the upper limit of a normally charged A/C system. If the value of PRED is not greater than CAL4, then the program proceeds directly to step 222. If, however, the value of PRED is greater than the value of CAL4, CTR is set to 0 (zero) at step 221, thus disregarding any prior accumulated refrigerant low-charge events and initializing CTR.

Step 222 next determines if enough refrigerant low-charge events have accumulated during the most recent period of uninterrupted compressor operation. If the value of CTR is not greater than a predetermined events calibration value (CAL5), then the program proceeds directly to step 224 where control is returned to the background program. If, however, the value of CTR is greater than the value of CAL5, the maximum number of refrigerant low-charge events has been exceeded during a single period of uninterrupted compressor operation and the program continues to step 223. Step 223 sets a LOW CHARGE flag indicating a refrigerant low-charge condition. Step 225 next causes the compressor to cycle off and the program proceeds to step 224 where control is returned to the background program.

Preferably, once the compressor has been disengaged in response to the prediction program, it will remain disengaged at least until the vehicle undergoes an ignition cycle. The step of the LLOQ CHARGE flag set at step 223 can be used as an overriding software input to control continued disengagement of the cycling clutch during the ignition cycle in which it was set and may be reset during an initialization sequence after the vehicle ignition is cycled.

While the invention has been described in conjunction with a specific embodiment thereof, it is evident that many alternatives, modifications and variations will be apparent to one skilled in the art. Accordingly, the invention is intended to embrace all alternatives, modifications and variations that are within the scope of the appended claims.

The embodiments of the invention in which an exclusive property or privilege is claimed are defined as follows:

1. In a vehicle air conditioning system having a compressor, expansion valve, evaporator and condenser, a method of preventing compressor damage due to a low refrigerant charge, said method comprising:

measuring ambient air temperature to produce a load signal;
measuring evaporator temperature and vehicle speed to produce respective first and second capacity signals corresponding thereto;
predicting said refrigerant charge from said load signal and said first and second capacity signals; and
disabling said compressor when said predicted refrigerant charge is below a predetermined level.

2. A method of preventing compressor damage due to a low refrigerant charge as claimed in claim 1, wherein the step of predicting said refrigerant charge comprises: calculating a value P from the following equation:

$$P = C1*MAT + C2*EVAP + C3*MPH + C4*1$$

wherein MAT represents the load signal corresponding to ambient air temperature, EVAP represents said first capacity signal corresponding to evaporator temperature, MPH represents said second capacity signal corresponding to vehicle speed; and
wherein C1, C2, C3 and C4 are coefficients derived from the interdependence of said load signal and said first and second capacity signals.

3. An improved vehicle air conditioning system having a compressor, expansion valve, evaporator and condenser, wherein the improvement comprises:

means for measuring ambient air temperature to produce a load signal;
means for measuring evaporator temperature and vehicle speed to produce respective first and second capacity signals corresponding thereto;
means for predicting said refrigerant charge from said load signal and said first and second capacity signals; and
means for disabling said compressor when said predicted refrigerant charge is below a predetermined level.

4. An improved vehicle air conditioning system having a compressor, expansion valve, evaporator and condenser, wherein the improvement comprises:

means for measuring ambient air temperature to produce a load signal;
means for measuring evaporator temperature to produce a first capacity signal;
means for measuring a quantity related to one of a) compressor speed and b) condenser air flow to produce a second capacity signal;
means for predicting said refrigerant charge from said load signal and said first and second capacity signals; and
means for disabling said compressor when sad predicted refrigerant charge is below a predetermined level.

5. An improved vehicle air conditioning system having a compressor, expansion valve, evaporator and condenser, wherein the improvement comprises:

means for measuring ambient air temperature to produce a load signal;
means for measuring a quantity related to evaporator temperature to produce a first capacity signal
means for measuring a quantity related to compressor speed to produce a second capacity signal;
means for measuring condenser air flow to produce a third capacity signal;

means for predicting said refrigerant charge from said load signal and said first, second and third capacity signals; and means for disabling said compressor when said predicted refrigerant charge is below a predetermined level.

6. An improved vehicle air conditioning system according to claim 5 wherein a means for measuring vehicle speed comprises both said means for measuring a quantity related to compressor speed and said means for measuring a quantity related to condenser air flow.

7. In a vehicle air conditioning system having a compressor, expansion valve, evaporator and condenser, a method of preventing compressor damage due to a low refrigerant charge, said method comprising:

measuring ambient air temperature to produce a load signal;

measuring evaporator temperature to produce a first capacity signal;

measuring a quantity related to one of a) compressor speed and b) condenser air flow to produce a second capacity signal;

predicting said refrigerant charge from said load signal and said first and second capacity signals; and disabling said compressor when said predicted refrigerant charge is below a predetermined level.

8. In a vehicle air conditioning system having a compressor, expansion valve, evaporator and condenser, a method of preventing compressor damage due to a low refrigerant charge, said method comprising:

measuring ambient air temperature to produce a load signal;

measuring a quantity related to evaporator temperature to produce a first capacity signal;

measuring a quantity related to compressor speed to produce a second capacity signal;

measuring condenser air flow to produce a third capacity signal;

predicting said refrigerant charge from said load signal and said first, second and third capacity signals; and disabling said compressor when said predicted refrigerant charge is below a predetermined level.

9. The method as claimed in claim 8 wherein the steps of measuring a quantity related to compressor speed and said means for measuring a quantity related to condenser air flow are accomplished by measuring vehicle speed.

* * * * *